United States Patent [19]

Merkert

[11] 4,026,163

[45] May 31, 1977

[54] DOUBLE SPEED REDUCER UNIT ASSEMBLY

[75] Inventor: Clifton S. Merkert, Springfield, Pa.

[73] Assignee: FMC Corporation, San Jose, Calif.

[22] Filed: Jan. 15, 1975

[21] Appl. No.: 541,300

Related U.S. Application Data

[63] Continuation-in-part of Ser. No. 363,468, May 24, 1973, abandoned.

[52] U.S. Cl. .................................................. 74/425
[51] Int. Cl.² ......................................... F16H 1/16
[58] Field of Search ..................................... 74/425

[56] References Cited

UNITED STATES PATENTS

| 852,762 | 5/1907 | Bohrer | 74/425 |
|---|---|---|---|
| 1,890,685 | 12/1932 | Johnson | 74/425 |

Primary Examiner—Samuel Scott
Assistant Examiner—Wesley S. Ratliff, Jr.
Attorney, Agent, or Firm—J. F. Verhoeven; J. W. Edwards; C. E. Tripp

[57] ABSTRACT

An auxiliary speed reducer unit can be detachably mounted upon a main speed reducer unit to form a compound speed reducer. The main unit includes a housing and a worm shaft rotatably journalled therein with an end portion of the worm shaft extending from the housing. The auxiliary unit has a housing with an opening therein for receiving the end portion of the main unit worm shaft. An input worm shaft is rotatably journalled within the auxiliary housing and has a worm thereon that meshes with a worm gear. Within the worm gear is a central bore of a size to receive and key with the end portion of the main unit worm shaft. Annular grooves on opposite faces of the worm gear receive annular projections having a radial width less than said grooves. The projections extend from opposite sides of the auxiliary unit housing to support the worm gear in a loosely rotatable manner for limited play in the plane of the gear while the gear is in mesh with the input worm. The gear is held in a position with the central bore in approximate alignment with said auxiliary housing opening prior to connection of said worm gear to the main unit worm shaft. Thus, connection of the worm gear and worm shaft can be readily made by insertion under field conditions. After such connection and further mounting of the auxiliary unit housing to said main unit housing, the worm gear is carried by the worm shaft of the main unit and both the worm gear and worm shaft are free from engagement with said auxiliary housing.

13 Claims, 6 Drawing Figures

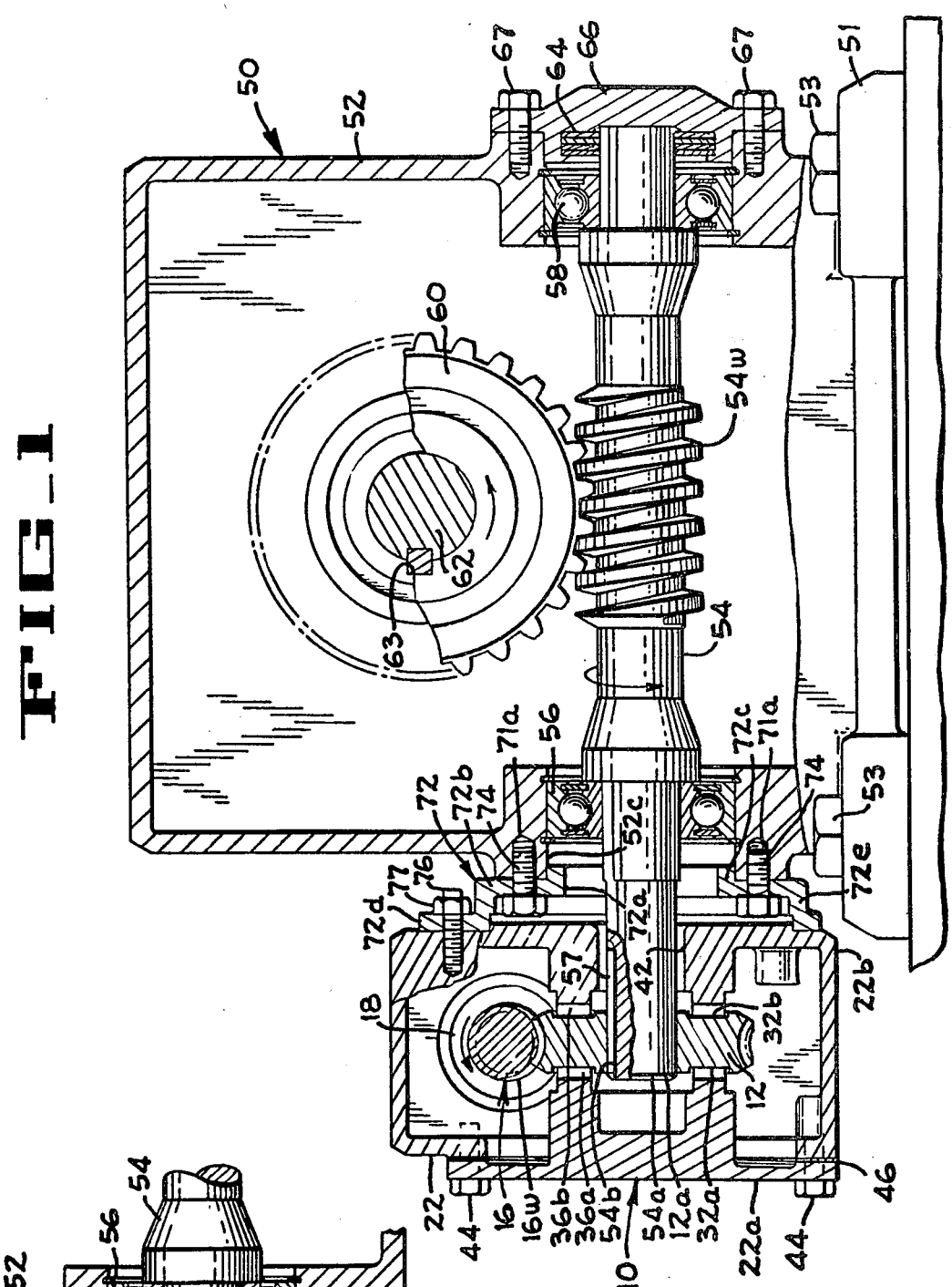

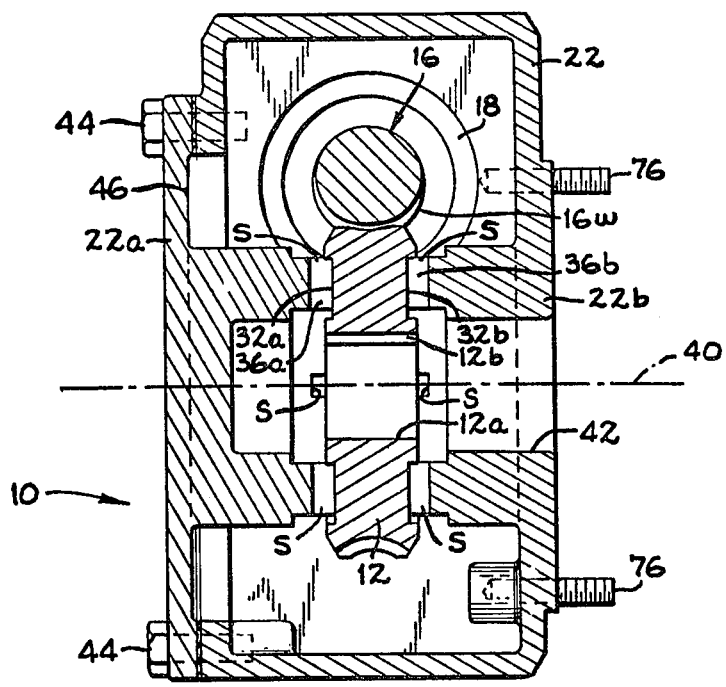
FIG_2
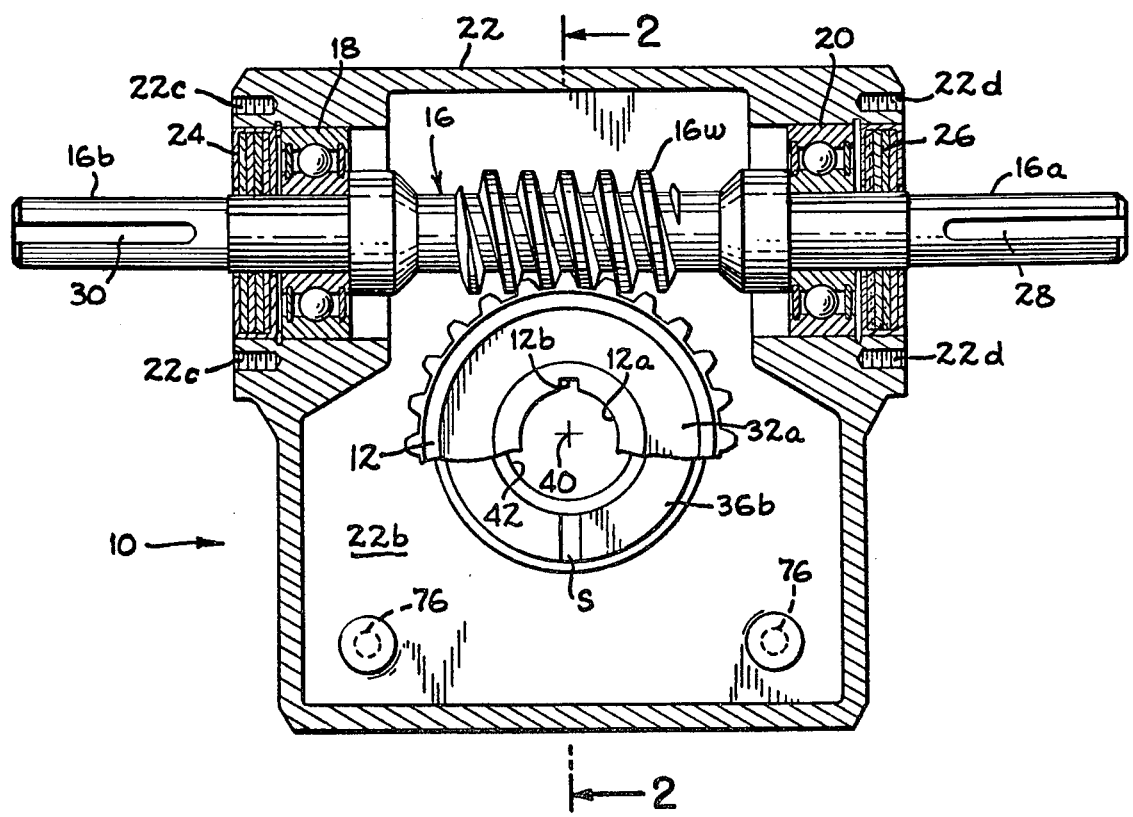
FIG_3

U.S. Patent   May 31, 1977   Sheet 3 of 3   4,026,163
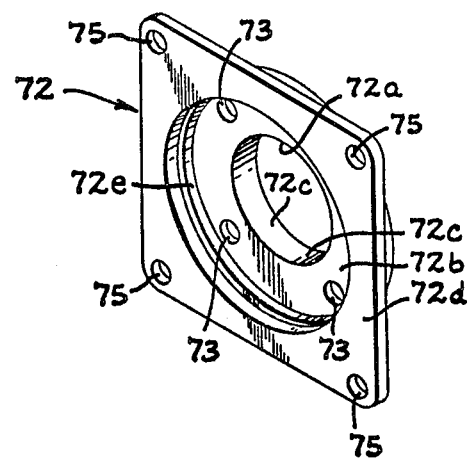
FIG_5
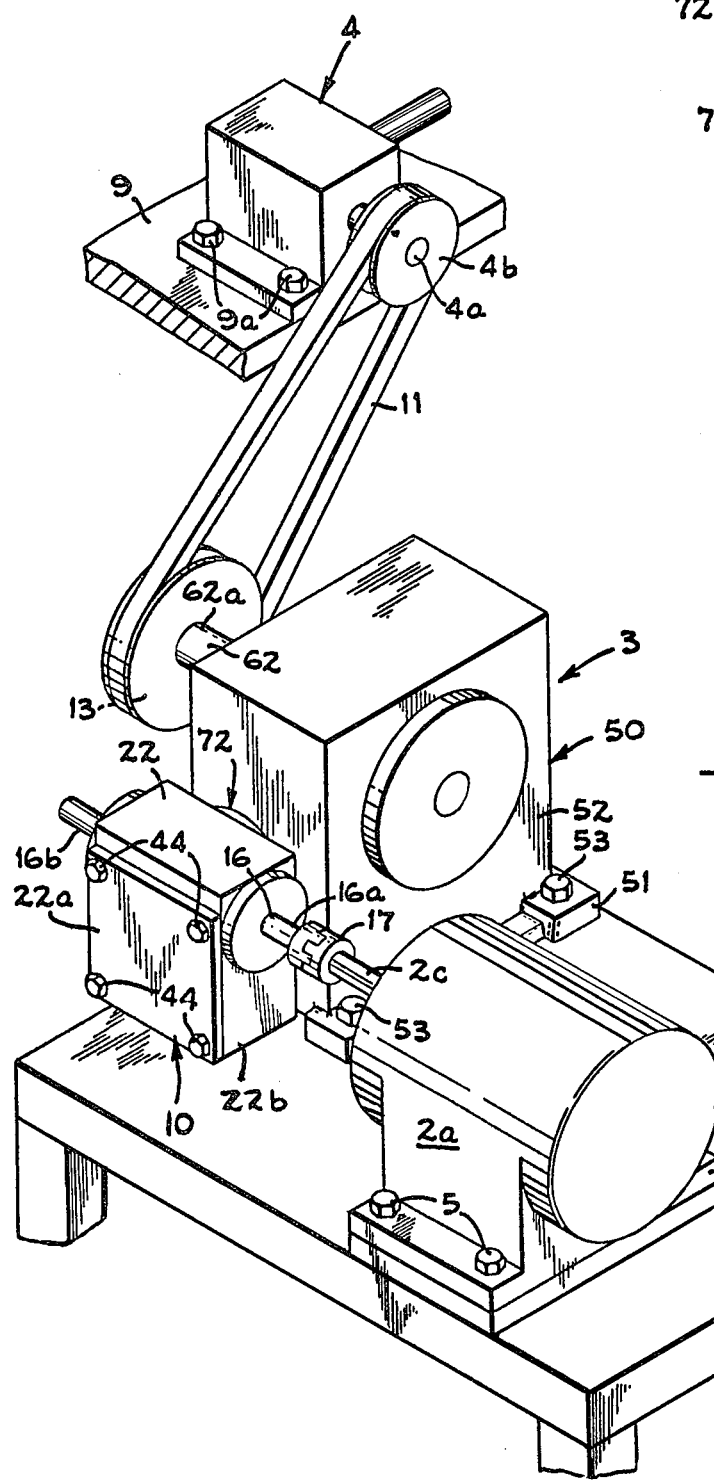
FIG_4

DOUBLE SPEED REDUCER UNIT ASSEMBLY

CROSS REFERENCE TO RELATED APPLICATION

This application is a continuation-in-part of my copending application Ser. No. 363,468, filed May 24, 1973 now abandoned.

BACKGROUND OF THE INVENTION

1. Field of the Invention

This invention relates to an auxiliary worm gear speed reducer unit that is attached by use of an adapter member to a main worm gear speed reducer unit to form a double speed reducer unit assembly.

2. Description of the Prior Art

It is well known to connect in a suitable manner the worm, or input, shaft of a worm gear speed reducer unit to the output, or drive, shaft of a primary drive unit, such as a motor, for speed reduction purposes. Rotation of the motor output shaft causes rotation of the worm gear, or output, shaft of the worm gear speed reducer unit at a speed lower than the speed of the output shaft of the motor. It is also well known to connect, in a suitable manner, the worm gear, or output, shaft of a first speed reducer unit to the worm, or input, shaft of a second worm gear speed reducer unit to obtain a further speed reduction, as shown, for example, in the U.S. Pat. No. 1,330,869. The worm gear, or output, shaft of the second unit rotates, in use, at a greatly reduced speed. Different coupling devices have been used to couple the worm gear, or output, shaft of the first worm gear reducer unit to the worm, or input, shaft of the second worm gear reducer unit. One drawback of such couplings is that the coupling shafts are difficult to precisely align, and the couplings add cost to the assembly. It is also known, in other types of two stage speed change mechanisms, to connect the two stages with a common shaft as shown, for example, in the application of Avramidis et al, Ser. No. 343,329, filed Mar. 21, 1973, and assigned to the same assignee as the assignee of the present invention.

SUMMARY OF THE INVENTION

A worm gear located within an auxiliary speed reducer unit housing is supported therein in a loosely rotatable manner for limited play in the plane of the gear while in mesh with an input worm. A central bore within the worm gear is approximately aligned with an opening in the auxiliary unit housing for receiving an end portion of a worm shaft extending from a main speed reducer unit housing where the worm shaft is rotatably journalled. Under field conditions, the end portion of the main unit worm shaft can be inserted through the auxiliary unit housing opening and into the central bore of the worm gear to key therewith. Upon mounting the auxiliary unit housing to the main unit housing, the worm gear is carried by the main unit worm shaft and both the worm gear and worm shaft are free from engagement with said auxiliary unit housing.

In a preferred form of the invention, annular grooves are provided on opposite faces of the worm gear and annular projections on the auxiliary unit housing extend from opposite sides thereof into the grooves. The projections have a radial width less than the radial width of the grooves to provide for the limited play in the plane of the gear. Thus, the worm gear is supported by the annular projections in eccentric relationship with both the worm gear and the annular grooves as to provide substantially only tangential support contact therebetween prior to engagement of the worm gear with the main unit worm shaft. After insertion of the main unit worm shaft into the worm gear and mounting the auxiliary unit housing to the main unit housing, the worm shaft supports the worm gear in concentric relationship with the projections leaving clearance within the annular grooves between the projections and the auxiliary housing.

BRIEF DESCRIPTION OF THE DRAWINGS

FIG. 1 is a central vertical section of an auxiliary worm gear speed reducer unit mounted on a main worm gear speed reducer unit by means of an adapter member bolted to each unit, the adapter bolts being shown out of position for clarity.

FIG. 1A is a fragmentary section showing a seal and end cover portion of the main worm gear speed reducer unit of FIG. 1, prior to assembly with the auxiliary unit.

FIG. 2 is a central vertical section of the auxiliary unit corresponding substantially to that portion of FIG. 1, but illustrating the auxiliary unit prior to assembly with the main unit.

FIG. 3 is a vertical section of the auxiliary unit taken perpendicular to the plane of FIG. 2, as indicated by the line 2—2 in FIG. 3, with the section being broken to show the annular grooves on one side of the worm gear and the annular projections on the opposite side of the worm gear.

FIG. 4 is a simplified representation of a motor in combination with the double speed reduction unit assembly of FIG. 1 driving a mechanical load.

FIG. 5 is a perspective view of the adapter member.

DESCRIPTION OF THE PREFERRED EMBODIMENT

Referring to the drawings, FIG. 4 illustrates, in a diagrammatic way, a primary drive unit, or motor, 2, combined with a double worm gear speed reduction unit assembly 3 and a mechanical load 4. The motor 2 includes a housing 2a, a base 2b, and a primary drive, or output, shaft 2c. Bolts 5 are used to bolt the base 2b to a support surface 7. The assembly 3 includes an auxiliary worm gear speed reducer unit 10 attached by an adapter member 72 to a main worm gear speed reducer unit 50 that includes a base 51 secured by bolts 53 to the support surface 7. The unit 10 includes an input, or worm, shaft 16 including opposite shaft ends 16a and 16b. A conventional coupling device 17 couples the shaft end 16a to the motor output shaft 2c. The unit 50 includes a worm gear shaft, or output shaft, 62 including a shaft end 62a. The mechanical load 4, which can be any suitable mechanical load, is shown as suitably supported on a support 9 and secured thereto by bolts 9a. The load 4 includes an input shaft 4a and a pulley wheel 4b affixed to the shaft 4a. A drive belt 11 is trained over the pulley wheel 4b and a pulley wheel 13 affixed to the end 62a of the shaft 62. When the motor shaft 2c rotates, each unit 10 and 50 effects a speed reduction so that the shaft 4a of the mechanical load 4 rotates at a greatly reduced speed.

The auxiliary gear reducer unit 10 (see FIGS. 2 and 3) includes a worm gear 12 (shown partially cutaway in FIG. 2) and also includes the worm shaft 16 received in bearings 18, 20 that are seated within openings in housing 22 near seals 24, 26. Threaded bores 22c in one side of the housing 22, spaced radially from the axis of the shaft 16, and threaded bores 22d in the opposite side of the housing 22, also spaced radially from the axis of the shaft 16, may be used in mounting a motor adapter and a motor (not shown) to either side of the housing 22 by using bolts introduced into the bores 22c or 22d to fasten the motor adapter to the housing 22. A motor (not shown) is supported by such motor adapter in a suitable manner. However, for illustrative purposes of the present disclosure, the motor 2, mounted on base 7, has been shown to drive the load through the double reducer unit instead of a motor mounted directly to the auxiliary reducer unit housing 22.

The shaft 16 (FIG. 3) is a worm shaft that includes a worm 16w. Ends 16a, 16b of worm shaft 16 have keyways 28, 30 for connecting an input member to either end of the shaft. As shown in FIG. 4, one portion of the coupling unit 17 is keyed to the shaft end 16a.

The worm gear 12 includes two annular grooves (see FIG. 2) 32a and 32b on opposite sides of the worm gear. Groove 32a receives an annular projection 36a of a housing cover 22a, and groove 32b receives an annular projection 36b of housing body 22b. Each projection includes four equispaced radial slots S to facilitate oil lubrication of the unit. An oil plug (not shown) in the housing 22 is used to introduce oil into the housing. The worm gear grooves 32a, 32b are concentric with a central opening 12a in worm gear 12. The opening has a key slot 12b on its periphery.

The annular projection 36b, and the adjoining part of housing body 22b, form a housing opening 42 that has a central axis 40. The worm gear grooves 32a, 32b are slightly wider in a radial direction than the projections 36a, 36b so that the latter fit closely but loosely into the former to support and hold the worm gear thereon. The cover 22a and housing body 22b are factory assembled using bolts 44 (shown in FIG. 4) received in aligned holes in the cover and housing body. An annular shim 46 between the cover and the housing body adjusts the cover position in relation to the housing body so that the projections 36a and 36b are spaced apart a distance greater than the width of gear 12 in an axial direction between grooves 32a and 32b. Thus, the projections 36a and 36b do not bind the gear 12 to prevent it from rotating about its axis, but, at the same time, act together as a support for the worm gear 12. Since the projections 36a and 36b have a radial width less than the radial width of the grooves 32a and 32b, the worm gear 12 is held in a loosely rotatable manner for limited play in the plane of the gear while in mesh with the auxiliary input worm 16w and with the worm gear central opening or bore 12a in approximate alignment with the auxiliary housing opening 42. This support, although concentric with axis 40, is radially spaced from the worm gear opening 12a and holds the worm gear 12 in slightly eccentric relationship to the projections 36a and 36b due to the difference in radial widths of the projections and grooves. With the projections 36a, 36b as a support for the worm gear, the worm gear can be fitted about an input worm shaft 54 that fits within the worm gear central opening 12a, as will later be described.

The unit 10 is assembled with the unit 50 with one end of an input worm shaft 54 of the unit 50 received directly in the worm gear 12, as shown in FIG. 1. After insertion of the input worm shaft 54 into the worm gear central opening or bore 12a of the worm gear 12, the worm shaft 54 support the worm gear 12. The unit 50 includes the base 51, housing 52, the worm shaft 54 with a worm 54w, shaft bearings 56 and 58, a worm gear 60 on the worm gear shaft 62, a seal 64 and an end plate 66. In FIG. 1, the gear 60 is shown partially cutaway and affixed to shaft 62 by a key 63. Bolts 67 secure the end plate 66 to the housing body 52. As indicated in FIG. 1A, the unit 50, before assembly to auxiliary unit 10, also includes a seal 68 and an annular end cover 70 disposed about the shaft 54 near the shaft bearing 56. Bolts 71 received in tapped bores 71a in the housing 52 secure the end cover to the housing. The seal 68 and end cover 70 are removed from the unit 50 prior to assembling it with the unit 10.

When the reducer unit 50 is assembled to the reducer unit 10, the worm shaft 54 extends through a housing opening 52c of the unit 50, extends through housing opening 42 of unit 10 and then extends into the worm gear opening 12a at shaft end 54a. The shaft end 54a includes a keyway 54b receiving a key 57 seated in the gear slot 12b to establish a drive connection between the worm gear 12 and the worm shaft 54.

The housing 22 is connected to the housing 52 by means of an annular adapter member 72 (shown in FIG. 5) which is secured by bolts 74 to the housing 52 and secured by studs 76 to the housing body 22b. The adapter member 72 includes an annular radial portion 72b forming a central, through opening 72a defined by a short tubular sleeve 72c; an outer radial flange portion 72d; and includes a connecting portion 72e extending between the portions 72b and 72d. The portion 72b includes a set of round mounting holes 73 arranged in a circle concentric with the adapter member opening 72a. The portion 72d includes a set of round mounting holes 75 arranged in a circle also concentric with the adapter member opening 72a.

The unit 10 is mounted on the unit 50 in the following manner. First, the bolts 71 (see FIG. 1A) are removed from the threaded bores 71a of the main housing 52 to remove the cover 70 and the seal 68 from the shaft end 54a to expose the four tapped bores 71a. Next, the adapter member 72 is positioned about the shaft end 54a by guiding the adapter member sleeve portion 72c into the housing opening 52c. The adapter member 72 is oriented with the member openings 73 in registry with the bores 71a of the housing 52. Next the bolts 74 are used to bolt the adapter member 72 to the housing 52.

The unit 10 is positioned alongside the adapter member 72 to align the housing opening 42 with the shaft end 54a. Relative movement is effected between the units 10 and 50, as by moving the unit 10 toward the unit 50, to slide the shaft end 54a into the opening 12a of the worm gear 12, using the key 57 to key the shaft to the worm gear. The studs 76 (see FIG. 3) are aligned with the holes 75 of the adapter member 72. Next, nuts 77 are threaded on the studs 76 to bolt the housing 22 to the adapter member 72. In this way the housing 22 of the unit 10 is secured to the housing 52 of the unit 50.

From the foregoing description, it will be seen that the projections 36a and 36b fitting within the grooves 32a and 32b hold the worm gear 12 in a loosely rotatable manner for limited play in the plane of the worm gear while in mesh with the auxiliary input worm 16w. The central opening or bore 12a of the worm gear is held in approximate alignment with the auxiliary housing opening 42 by the interfitting projections and grooves but there is a slight amount of deviation between the axes of the bore and housing opening due to the fact that the annular projections have a radial width less than the radial width of the annular grooves. While the projections from the housing are concentric with the housing opening, the worm gear drops to a position of substantially only tangential support between eccentrically aligned circular surfaces of the projections and grooves. In this position, the worm gear 12 within the auxiliary housing 22 can be readily fitted about the extending end portion of the main unit input worm shaft 54 while being maintained in mesh with the auxiliary input worm. Thus, connection between the auxiliary speed reducer unit 10 and the main speed reducer unit 50 can be readily made under field conditions and after mounting of the auxiliary unit housing 22 to the main unit housing 52, the worm shaft 54 supports both the worm gear 12 and its annular grooves in concentric relationship with the annular projections so that clearance is provided therebetween. Both the worm gear 12 and worm shaft 54 are free from engagement with the auxiliary unit housing 22 and can rotate therein without bearing contact.

Although the best mode contemplated for carrying out the present invention has been herein shown and described it will be apparent that modification and variation may be made without departing from what is regarded to be the subject matter of the invention.

What is claimed is:

1. A compound speed reducer comprising a main speed reducer unit having a housing and a worm shaft mounted in said housing for rotation on an axis with an end portion of the shaft extending from the housing, an auxiliary unit having a housing with an opening in said housing, means to secure said auxiliary housing to said main housing with said opening aligned about said rotational axis of the main worm shaft, a worm shaft journaled in the auxiliary housing, said auxiliary worm shaft having a worm thereon, a worm gear mounted in the auxiliary housing, said auxiliary worm gear having a central bore therein, and means radially spaced from said central bore to support said auxiliary worm gear in the auxiliary housing in engagement with said worm and with said central bore in approximate alignment with the opening in the auxiliary housing prior to receipt of the main worm shaft to permit quick and convenient insertion of said main worm shaft into said auxiliary worm gear for easy connection of the auxiliary unit onto the main unit, said auxiliary worm gear and said main worm shaft being supported independently of the auxiliary housing in directions radial to the main worm shaft after such field connection.

2. The compound speed reducer of claim 1, wherein said means for supporting said auxiliary worm gear in said auxiliary housing prior to receipt of the main worm shaft comprises opposed annular projections on either the auxiliary housing or the auxiliary worm gear that are received by complementary annular grooves in the opposite member, there being radial clearance between the sides of said projections and the edges of their associated grooves after receipt of the main worm shaft within the central bore of said auxiliary worm gear.

3. The compound speed reducer of claim 2, wherein said projections are on the auxiliary housing and the grooves are formed in said worm gear.

4. The compound speed reducer of claim 1 wherein said means to secure said auxiliary housing to said main housing includes an adapter detachably connected to the main housing and the auxiliary housing, said adapter having an opening therein for receiving said main worm shaft.

5. The compound speed reducer of claim 4 including a cover having an opening therein for receiving the main worm shaft, said cover being detachably connected to said main housing alternatively with said adapter.

6. A speed reducer unit comprising a housing member having an output shaft receiving opening therein, a worm and worm input shaft rotatably mounted in said housing member, a worm gear member positioned within said housing member and having a central opening therein for slidably receiving an output shaft, and means radially spaced from said worm member central opening to hold said worm gear member in engagement with said worm and with said control opening in the worm gear member substantially aligned with the output shaft receiving opening in the housing member prior to receipt of the output shaft, said worm gear member holding means having sufficient radial clearance that the worm gear member after receipt of an output shaft within the central opening can be supported by the output shaft independently of the housing member, thereby enabling the worm gear member and output shaft to rotate free of bearing contact with the housing member.

7. A speed reducer unit as described in claim 6 wherein said worm gear member holding means comprises opposed annular projections on one of said members received by complementary annular grooves in the other of said members, there being radial clearance between the sides of said projections and the edges of their associated grooves after receipt of the output shaft within the central opening of the worm gear member.

8. A speed reducer unit as described in claim 7 wherein said projections are on the housing member and the grooves are formed in said worm gear member.

9. A compound speed reducer comprising:
a main speed reducer unit including a housing and a worm shaft rotatably journalled in said housing with an end of said shaft extending from said housing,
an auxiliary speed reducer unit having a housing provided with an opening therein of greater diameter than said main worm shaft,
means for detachably securing said auxiliary unit housing to said main unit housing with said shaft extending through said opening and into said auxiliary unit housing,
said auxiliary unit housing having an input worm shaft rotatably journalled therein,
a worm gear having a bore therein sized to receive and key with said main worm shaft end,
means on said worm gear and on said auxiliary unit housing for loosely rotatably supporting said worm gear for limited play in the plane of the gear while in mesh with said auxiliary input worm and with said worm gear bore in approximate alignment with said housing opening prior to connection of said gear to said main worm, thereby to permit easy connection of said auxiliary housing to said main housing and connection of said main worm shaft to said worm gear under field conditions,
whereby said worm gear is carried by said main worm shaft with said housings detachably secured and said worm gear and said main worm shaft are free from engagement with said auxiliary housing.

10. An auxiliary speed reducer unit for attachment to a main speed reducer unit housing and to a worm shaft and extending therefrom to provide an additional speed reduction, said auxiliary speed reducer unit comprising a housing with an opening therein of greater diameter than the worm shaft of said main speed reducer unit, an input worm shaft rotatably journalled within the auxiliary unit housing, a worm gear having a central bore sized to receive a key with the worm shaft of said main unit, means on said worm gear and on said auxiliary unit housing for loosely rotatably supporting said worm gear for limited play in the plane of the gear while in mesh with said input worm and with said central bore in approximate alignment with said housing opening prior to connection of said worm gear to the worm shaft of the main unit to thereby enable easy connection thereof under field conditions, whereby after such connection and after attachment of said auxiliary unit housing to said main unit housing said worm gear is carried by the worm shaft of the main unit and both are free from engagement with said auxiliary housing.

11. A compound speed reducer comprising:
a main speed reducer unit including a housing and a worm shaft rotatably journalled in said housing with an end of said shaft extending from said housing,
an auxiliary speed reducer unit having a housing provided with an opening therein of greater diameter than said main worm shaft,
means for detachably securing said auxiliary unit housing to said main unit housing with said shaft extending through said opening and into said auxiliary unit housing,
said auxiliary unit housing having an input worm shaft rotatably journalled therein,
a worm gear having a bore therein sized to receive and key with said main worm shaft end,
means on said worm gear and on said auxiliary unit housing for loosely rotatably supporting said worm gear for limited play in the plane of the gear while in mesh with said auxiliary input worm and with said worm gear bore in approximate alignment with said housing opening prior to connection of said gear to said main worm, thereby to permit easy connection of said auxiliary housing to said main housing and connection of said main worm shaft to said worm gear under field conditions,
said worm gear supporting means having annular grooves on opposite faces of said worm gear and having annular projections on said auxiliary unit housing that extend from opposite sides thereof toward and into said annular grooves,
said projections having a radial width less than the radial width of said grooves providing substantially only tangential supporting contact therebetween prior to engagement of said worm gear with said main worm shaft,
whereby said worm gear is carried by said main worm shaft with said housings detachably secured and said worm gear and said main worm shaft are free from engagement with said auxiliary housing.

12. The compound speed reducer of claim 10 wherein said auxiliary housing includes a detachable cover on the side thereof opposite said opening, wherein one said annular projection extends from said cover and the other said annular projection extends inwardly of said housing in radially spaced bounding relation to said opening.

13. An auxiliary speed reducer unit for attachment to a main speed reducer unit housing and to a warm shaft and extending therefrom to provide an additional speed reduction, said auxiliary speed reducer unit comprising a housing with an opening therein of greater diameter than the worm shaft of said main speed reducer unit, an input worm shaft rotatably journalled within the auxiliary unit housing, a worm gear having a central bore sized to receive a key with the worm shaft of said main unit, means on said worm gear and on said auxiliary unit housing for loosely rotatably supporting said worm gear for limited play in the plane of the gear while in mesh with said input worm and with said central bore in approximate alignment with said housing opening prior to connection of said worm gear to the worm shaft of the main unit to thereby enable easy connection thereof under field conditions, said worm gear supporting means having annular grooves on opposite faces of said worm gear and having annular projections on said auxiliary unit housing that extend from opposite sides thereof toward and into said annular grooves, said projections having a radial width less than the radial width of said grooves and support said worm gear eccentrically in relationship with said projections prior to engagement of said worm gear with said worm shaft of the main unit and thereafter said main unit worm shaft supports said worm gear so that when said auxiliary unit housing is attached to said main unit housing the worm gear is supported concentrically in relationship with said projections leaving clearance within said annular grooves between said projections and said auxiliary housing, whereby after such connection and after attachment of said auxiliary unit housing to said main unit housing said worm gear is carried by the worm shaft of the main unit and both are free from engagement with said auxiliary housing.

* * * * *

UNITED STATES PATENT OFFICE
CERTIFICATE OF CORRECTION

Patent No. 4,026,163          Dated  May 31, 1977

Inventor(s) Clifton S. Merkert

It is certified that error appears in the above-identified patent and that said Letters Patent are hereby corrected as shown below:

Column 1, line 34:  after "the" change "coupling" to --coupled-- .

Column 6, line 14:  "control" to --central--.

Column 8, line 16:  "warm" to --worm--.

Signed and Sealed this

Thirteenth Day of November 1979

[SEAL]

Attest:

RUTH C. MASON
Attesting Officer

LUTRELLE F. PARKER
Acting Commissioner of Patents and Trademarks